United States Patent [19]
Nustede et al.

[11] Patent Number: 4,795,876
[45] Date of Patent: Jan. 3, 1989

[54] METHOD AND APPARATUS FOR PRELIMINARILY TACKING STRUCTURAL COMPONENTS TO EACH OTHER

[75] Inventors: Fritz Nustede, Karlsfeld; Josef Hanninger, Sixtnitgern; Josef Schallinger, Vachendorf, all of Fed. Rep. of Germany

[73] Assignee: MTU Motoren-und Turbinen-Union Muenchen GmbH, Munich, Fed. Rep. of Germany

[21] Appl. No.: 94,829

[22] Filed: Sep. 9, 1987

[30] Foreign Application Priority Data

Sep. 12, 1986 [DE] Fed. Rep. of Germany ....... 3631154

[51] Int. Cl.⁴ ............................................... B23K 11/30
[52] U.S. Cl. ........................ 219/86.1; 219/86.25; 219/117.1; 219/119
[58] Field of Search ................. 219/86.1, 86.24, 86.25, 219/86.7, 92, 96, 93, 94, 95, 98, 99, 103, 117.1, 119

[56] References Cited

U.S. PATENT DOCUMENTS

| | | | |
|---|---|---|---|
| 1,592,605 | 7/1926 | Ledwinka | 219/94 |
| 3,288,976 | 11/1966 | Sandret | 219/103 |
| 3,526,743 | 9/1970 | Spisak | 219/98 |
| 4,145,596 | 3/1979 | Pignal | 219/98 |
| 4,327,272 | 4/1982 | Hinden | 219/94 |
| 4,497,428 | 2/1985 | Baumann | 228/175 |
| 4,629,857 | 12/1986 | Gauger | 219/98 |

FOREIGN PATENT DOCUMENTS 45-23408 8/1970 Japan ................. 219/85 R

OTHER PUBLICATIONS

"Werkstatt und Betrieb", 119 (1986), vol. 2, p. 147, published by Carl Hanser Verlag, Munich, Federal Republic of Germany.
"Schweissen und Schneiden", 33 (1981), vol. 11, pp. 594 and 595.

Primary Examiner—Clifford C. Shaw
Attorney, Agent, or Firm—W. G. Fasse; D. H. Kane, Jr.

[57] ABSTRACT

Structural components, for example rotor components for a flow-dynamic engine, are first tacked to each other prior to final joining. The tacking is accomplished by a spot resistance welding or a high energy ray welding using a small welding material ball at each welding spot or location. The balls are supplied to a welding spot through a hollow, evacuated electrode of the resistance welding apparatus.

6 Claims, 3 Drawing Sheets

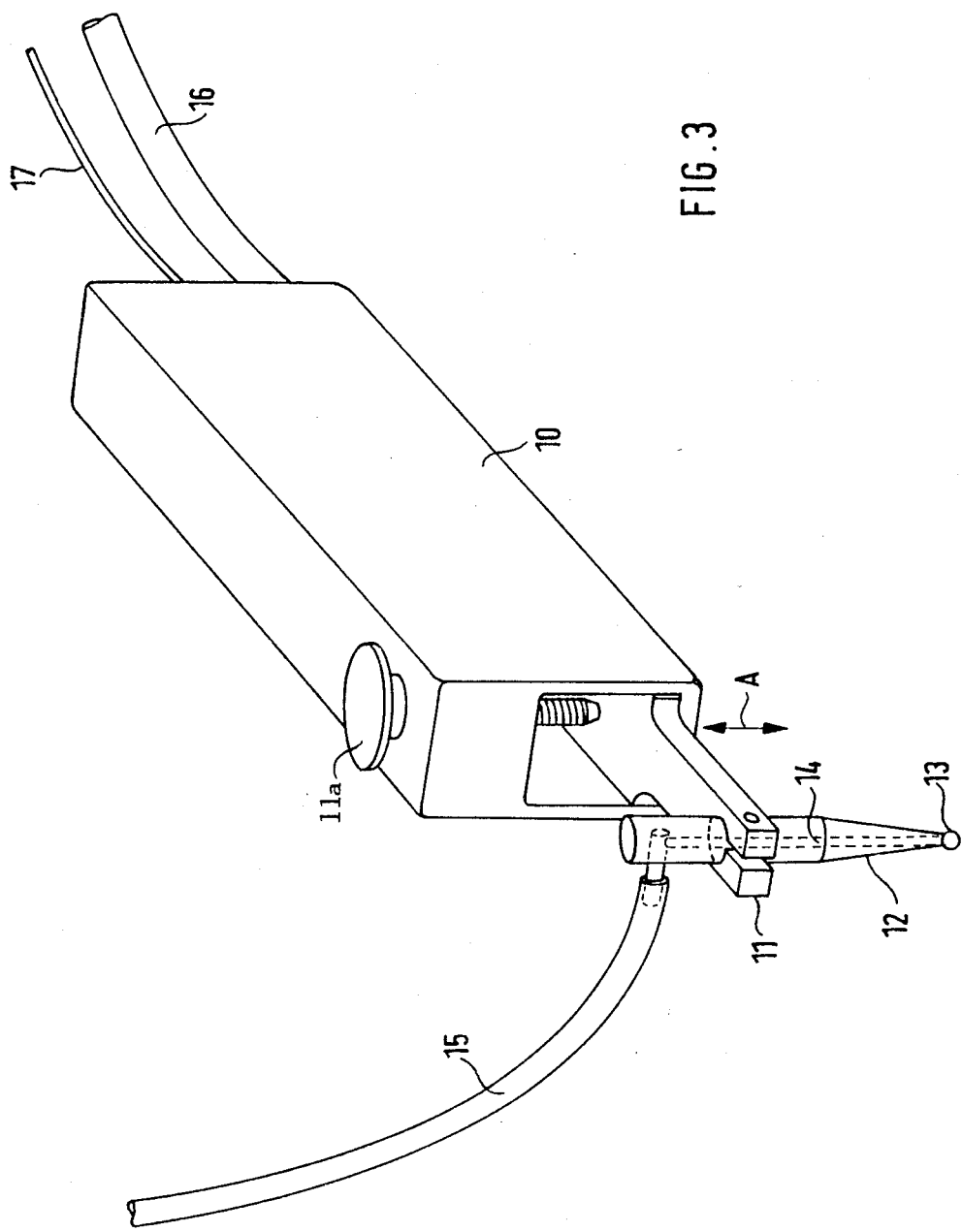

METHOD AND APPARATUS FOR PRELIMINARILY TACKING STRUCTURAL COMPONENTS TO EACH OTHER

FIELD OF THE INVENTION

The invention relates to a method for tacking structural components to each other as a preliminary step to a final joining operation, for example, by soldering, brazing, or welding. The invention also relates to a spot welding electrode for performing the tacking operation.

DESCRIPTION OF THE PRIOR ART

It is known, to initially tack structural components to each other prior to their final joining, for example, by soldering, brazing, or welding. The tacking is performed at just a few spots or locations along the edges of interfacing surfaces along which the components are to be joined to form the complete structure. The purpose of the tacking is to keep the structural components temporarily in a determined or so-called located position without a substantial effort and expense for such initial locating of the structural components relative to each other in order to make them ready for the subsequent final joining step by thermal action.

The tacking operation is especially practical where structural components are to be joined that require a small gap between their interfacing surfaces, whereby such gap needs to be filled with a joining material such as solder or brazing material or welding material. Thereafter, this material in the gap is heated, melted, and cooled to provide the rigid, permanent joining of the structural components.

Conventional tacking methods employ the customary welding procedures, such as the tungsten-inert gas-welding WIG welding), the electrode gas welding, or the laser beam welding.

Welding operations of this type are described in "Werkstatt und Betrieb" 119 (1986), volume 2, page 147 published by Carl Hanser Verlag, Munich. Suitable solders and soldering methods are described in the trade magazine "Schweissen und Schneiden" 33 (1981), volume 11, pages 594 and 595.

Conventional tacking operations have the disadvantage that their performance in combination with the required quality control is rather involved and hence expensive. Another problem with conventional tacking operations resides in the fact that the spreading of the heat is hard to control. In other words, it is difficult to localize the heat at the tacking spot. As a result an annealing tint around the tacking spot cannot be avoided. Additionally, the uncontrolled spreading of the tacking heat can change the gap width between the two components to be joined and it can even cause warping of the components so that undesirable stresses are generated in the structural components. Another undesirable feature is the formation of oxidation layers on the surfaces of the heated locations.

OBJECTS OF THE INVENTION

In view of the foregoing it is the aim of the invention to achieve the following objects singly or in combination:

to avoid the drawbacks and disadvantages of the prior art, more specifically to provide a tacking method and tool which will assure an exact tacking of structural components to each other without a substantial effort and expense;

to provide for a better control of the heat distribution at a localized tacking spot to thereby avoid discolorations distortions, undesirable stresses, and the formation of oxide layers on the surface of the components to be joined;

to tack structural components to each other with a sufficient strength so that the components will retain their relationship relative to each other for the subsequent permanent joining; and to provide a tool or electrode suitable for performing the present method.

SUMMARY OF THE INVENTION

According to the invention the present method employs an electrode type of tool, particularly a spot welding electrode, which is capable of supplying a piece of tacking material, especially a spherical piece of tacking material, to the taking location by transfering the piece of tacking material, for example from a supply container, with the aid of reduced pressure to which the tool is connected whereupon the tool may act as an electrode in a spot welding operation for passing a sufficient electrical current through the piece of tacking material or by applying a high energy beam for the tacking operation.

The present electrode is a hollow tubular member having a longitudinal channel through which a reduced pressure is effective for picking up and holding a piece of welding material such as a little sphere.

Substantial advantages of the invention are seen in that the present tool is inexpensive and well-suited for example, for an electrical resistance welding capable of operating without any involved and expensive protective gas supply.

The application of the piece of tacking material such as a spherical welding material can be performed rapidly and without any complications in that the hollow welding electrode which is connected to a source of reduced pressure moves with its tip end into a supply of tacking material balls, whereby a ball is automatically sucked onto the end tip of the electrode. Thereafter, the ball attached to the electrode is brought into contact with the tacking spot or location, thereby closing an electrical current supply circuit for performing a resistance welding for melting the ball onto the two structural components to be tacked together. The electrode is connected to a conventional spot welding apparatus.

In addition to the simple supply of the welding material as taught herein, it is also very easy to precisely control the quantity of the spot welding material by selecting the proper size of a ball. Another advantage of the proper size of a welding ball is seen in that the applied heat quantity adapts itself automatically to the revailing operating conditions including the size of the ball. Thus, the supply of excess heat and the above mentioned disadvantages resulting from an excess heat supply, are avoided according to the invention. More specifically, oxidaion, discoloration, warping and undesirable stresses are avoided.

A further advantage is seen in that the time needed for performing the tacking operation and the quality control of the finished tacking has been substantially reduced as compared, for example with the above mentioned (WIG) welding method. In fact, the present method works twice as fast. Moreover, the percentage of rejects is substantially smaller than in the prior art.

Due to the precise measuring of the welding material in the form of balls of predetermined size, any waste of welding material is also avoided and the balls as such are relatively inexpensively available on the market.

BRIEF DESCRIPTION OF THE DRAWINGS

In order that the invention may be clearly understood, it will now be described, by way of example, with reference to the accompanying drawings, wherein:

FIG. 3 shows a spot welding apparatus equipped with a spot welding electrode according to the invention.

DETAILED DESCRIPTION OF PREFERRED EXAMPLE EMBODIMENTS AND OF THE BEST MODE OF THE INVENTION

Figure 1:
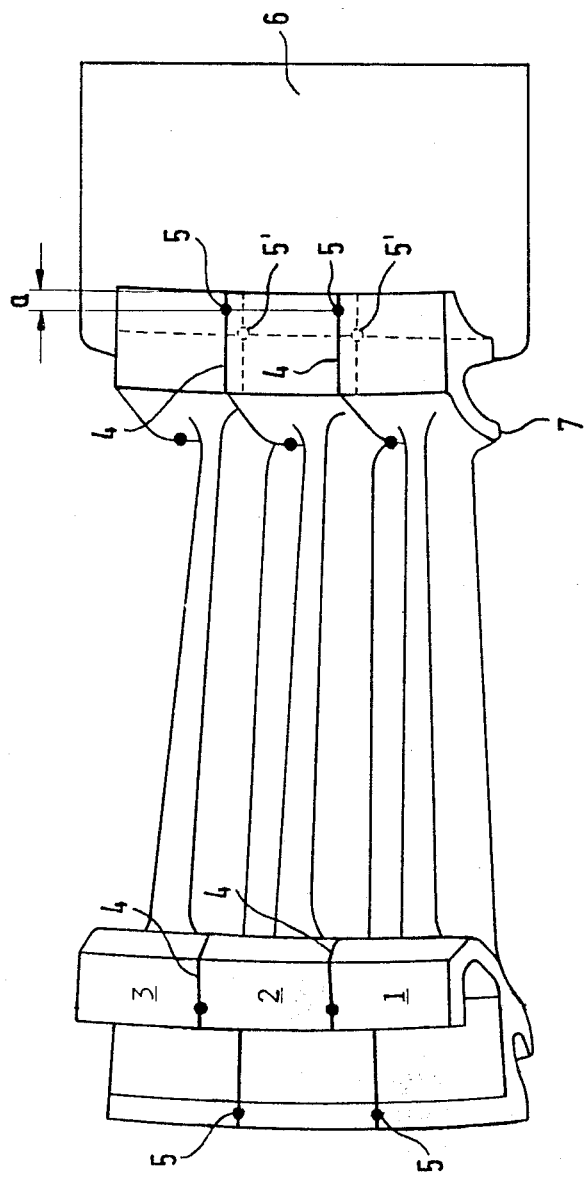
FIG. 1 is a perspective view of three structural components in the form of blades for a rotor of a flow-dynamic engine held in a locating or mounting jig.

As shown in FIG. 1, three individual structural components 1, 2, and 3, such as the blades for a rotor ring of a flow-dynamic engine, are to be tacked and then connected to form the rotor ring. The entire ring includes more than three blades. However, three blades 1, 2, 3 are sufficient to describe the invention. First it is necessary to bring the structural components into a defined position relative to each other in an assembly jig 6, which permits maintaining a defined gap between neighboring components or blades. The gap width is defined by the thickness of foil sections 4 inserted between the interfacing surfaces facing each other across the gap or foil section 4. Tacking spots 5 are formed by localized welding operation such as a spot welding by electrical current or a spot welding by a high energy beam such as a laser beam. These tacking spots 5 are visible to the viewer. The tacking spots 5' are located on the back side of the three components. According to the invention, the tacking spots 5 are formed by small spheres of welding material which are so dimensioned and so located and welded in place that they bridge the respective gap 4. Thus, the structural components are interconnected initially with a sufficient stability in order to assure, at least temporarily, the required relative position of the structural components to each other until the final joining, for example by soldering or brazing or welding, can be performed.

Figure 2:
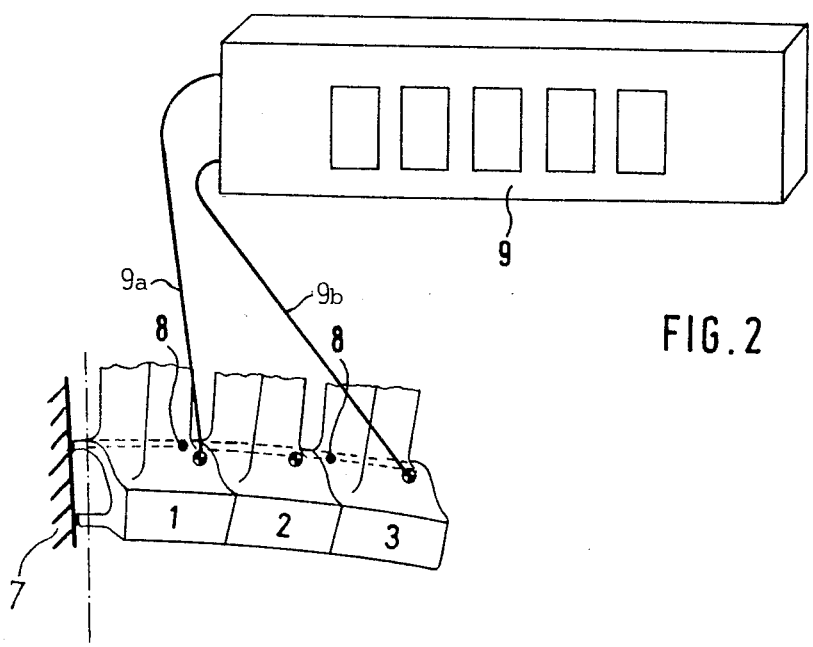
FIG. 2 is a view showing portions of the three tacked structural components in a testing station.

FIG. 2 shows the three tacked components placed against a fixed reference plane 7 for measuring or testing whether these components have the desired position relative to each other. Measuring points 8 are selected with defined positions relative to the fixed reference plane 7. An electronic multi-position measuring device 9 with two probes 9a and 9b, measures simultaneously at least two points. More specifically, these probes measure the spacing of the points 8 from the reference plane 7. Such a measuring operation is simple and can be performed in a minimum of time. Practical experience has shown that the measurements take less than a minute. Conventional electronic measuring devices can be used. However, optical measurements are also possible.

Under certain circumstances it may be desirable to perform after the above described measurement a stress-application or an alignment of the tacked components which may require an intermediate heating of these components. Thereafter the permanent joining is performed by the above mentioned soldering or brazing or welding operation, whereby additional material in the form of solder or welding material may be used. It has been found to be especially advantageous to use the spacer sections 4 which form the respective gap, in the form of a foil of solder and to perform the permanent joining as a high temperature brazing for example by the application of a high frequency brazing or heating of the soldering locations by means of induction coils. Such soldering or brazing is known in the art.

Instead of the just mentioned joining possibilities one may use electrical seam welding methods such as electric arc welding for assembling the final structure such as the above mentioned rotor ring. The measuring following the tacking and the final testing after the permanent joining may be performed automatically to assure the required quality control. The respective devices are well known in the art and may be part of an automatic assembly line. Such assembly line may also comprise stations for a final machining operation such as a grinding or polishing station.

The preliminary tacking apparatus may also be part of an assembly line. FIG. 3 shows the tacking apparatus according to the invention with a hollow electrode 12 having a channel, preferably an axial channel 14, connected to a source of reduced pressure through a hose 15.

Contrary to known methods in which a tacking operation was not used at all or in which especially a warp-free tacking was not employed or where the tacking was performed with the same or similar type of joining as used for the final permanent joining, the invention has substantial advantages by using small balls in a diameter range of 1 to 5 mm as a quantity controlled welding material preferably made of the same material as the structural components to be tacked. The balls may also be made of soldering material or of a welding electrode material with the respective additives. Another important advantage of the invention is seen that the balls are supplied directly to the welding spot by means of the above mentioned spot welder 10 which is displaceable up and down as indicated by the arrow A. The spot welder 10 may be secured to a robot arm not shown. The position of the spot welding electrode 12 within its mounting fork 11 may be adjustable and the mounting fork itself may also be adjustable in its position as indicated by the adjustment screw 11a. As shown, the electrode 12 carries at its bottom a welding sphere 13 held in place by suction through the channel 14 and hose 15. For this purpose the channel 14 must have a dimension smaller than the diameter of the sphere 13 as shown in FIG. 3. A conventional power cable 16 and a conventional control conductor 17 lead to the robot to which the spot welder 10 is secured. The robot includes the welding transformer and all other control components. The control makes sure that the required welding impulses of high energy are applied with a proper timing.

In the embodiment of FIG. 3 the balls are picked up by tilting the electrode 12 into a position above a supply container and by then tilting it back into the welding position after a ball has been picked up by suction. Other supply methods are also possible, for example a pneumatic blowing may be employed instead of the suction or a magnetic pick up may be employed for transporting the welding balls 13 into the proper position.

As mentioned, the invention is not limited to electrical spot welding, for example other localized welding methods may be employed such as high energy beam welding methods.

Although the invention has been described with reference to specific example embodiments, it will be appreciated, that it is intended to cover all modifications and equivalents within the scope of the appended claims.

What we claim is:

1. A method for performing a preliminary tacking operation to connect structural components to each other prior to a final joining, comprising the following steps,
    (a) connecting a hollow suction welding electrode to a source of reduced pressure, said hollow suction welding electrode having a suction channel with a dimension at least at one end smaller than that of a piece of welding material,
    (b) picking-up a piece of welding material with said one end of said hollow suction welding electrode by attracting said piece of welding material to said one end of said hollow suction welding electrode by suction,
    (c) holding said piece of welding material by suction while transporting said piece of welding material to a tacking location, and maintaining said piece of welding material in place in said tacking location by said one end of said hollow suction welding electrode for said tacking operation, and
    (d) performing said tacking operation by a localized welding operation with said hollow suction welding electrode.

2. The method of claim 1, wherein said piece of welding material is formed as a sphere having a diameter larger than a diameter of said suction channel.

3. The method of claim 1, wherein said structural components have interfacing surfaces, said method further comprising locating said structural components into a position relative to each other prior to said localized welding operation, for forming a gap between said interfacing surfaces, inserting spacer foil sections at least into parts of said gap, fixing said structural components in a located position, and then performing said localized welding operation.

4. The method of claim 3, wherein said spacer foil is used as a soldering or welding or brazing material for a final joining.

5. The method of claim 3, further comprising inserting soldering or welding, or brazing material into said gap after said tacking and increasing the temperature for performing a finish joining operation to connect said structural components to each other.

6. The method of claim 1, wherein said pieces of welding material are supplied automatically to said localized welding operation.

* * * * *